United States Patent
Chin et al.

(10) Patent No.: US 12,498,797 B2
(45) Date of Patent: Dec. 16, 2025

(54) NAVIGATION DEVICE WITH IMPROVED LIGHT UTILIZATION EFFICIENCY AND OPTICAL ENGINE THEREOF

(71) Applicant: PIXART IMAGING INC., Hsin-Chu County (TW)

(72) Inventors: Yee-Loong Chin, Penang (MY); Wan-Piang Lim, Penang (MY); Sai-Mun Lee, Penang (MY)

(73) Assignee: PIXART IMAGING INC., Hsin-Chu County (TW)

( * ) Notice: Subject to any disclaimer, the term of this patent is extended or adjusted under 35 U.S.C. 154(b) by 0 days.

(21) Appl. No.: 18/504,192

(22) Filed: Nov. 8, 2023

(65) Prior Publication Data
US 2024/0069650 A1    Feb. 29, 2024

Related U.S. Application Data

(63) Continuation-in-part of application No. 17/535,662, filed on Nov. 25, 2021, now Pat. No. 11,886,649.

(51) Int. Cl.
*G06F 3/03* (2006.01)
*G06F 3/0354* (2013.01)

(52) U.S. Cl.
CPC ........ *G06F 3/0304* (2013.01); *G06F 3/03543* (2013.01)

(58) Field of Classification Search
CPC .. G06F 3/0304; G06F 3/0317; G06F 3/03543; G06F 3/03
See application file for complete search history.

(56) References Cited

U.S. PATENT DOCUMENTS

| | | | | |
|---|---|---|---|---|
| 8,410,419 | B2* | 4/2013 | Momtahan | G06F 3/0317 250/221 |
| 9,218,069 | B2* | 12/2015 | Lee | G06F 3/0321 |
| 11,157,113 | B2* | 10/2021 | Winkler | G06F 3/0421 |
| 11,921,296 | B2* | 3/2024 | Lee | G02B 27/0916 |
| 2005/0231465 | A1* | 10/2005 | DePue | G01D 5/30 345/156 |
| 2005/0231482 | A1* | 10/2005 | Theytaz | G06F 3/0317 345/166 |
| 2007/0013661 | A1* | 1/2007 | Theytaz | G06F 3/03543 345/166 |
| 2007/0236455 | A1* | 10/2007 | Cheah | G06F 3/0317 345/166 |

(Continued)

*Primary Examiner* — Olga V Merkoulova
(74) *Attorney, Agent, or Firm* — HAUPTMAN HAM, LLP

(57) ABSTRACT

There is provided a navigation device including a light source, a light guide and a light sensor. The navigation device is operated relative to a work surface. The light source generates an illumination beam passing through the light guide to generate an illuminated area on the work surface. The light sensor receives reflected light from the illuminated area via the light guide. When a working gap between the navigation device and the work surface is increased, a first size of the illuminated area in a first direction is substantially identical to a first initial size of the illumination beam in the first direction after just leaving the light guide, and a second size of the illuminated area in a second direction is smaller than a second initial size of the illumination beam in the second direction after just leaving the light guide.

20 Claims, 4 Drawing Sheets

(56) References Cited

U.S. PATENT DOCUMENTS

| | | | | |
|---|---|---|---|---|
| 2008/0117439 A1* | 5/2008 | Leong | ............... | G06F 3/03543 |
| | | | | 356/614 |
| 2011/0108713 A1* | 5/2011 | Momtahan | ............ | G06F 3/0317 |
| | | | | 250/216 |
| 2014/0306894 A1* | 10/2014 | Lee | .................... | G06F 3/03543 |
| | | | | 345/166 |
| 2019/0317639 A1* | 10/2019 | Winkler | ................. | G01P 3/366 |
| 2019/0331473 A1* | 10/2019 | Johnson | ............ | G01B 9/02015 |
| 2020/0033611 A1* | 1/2020 | Lee | ................... | G02B 27/0905 |

* cited by examiner

NAVIGATION DEVICE WITH IMPROVED LIGHT UTILIZATION EFFICIENCY AND OPTICAL ENGINE THEREOF

CROSS-REFERENCE TO RELATED APPLICATIONS

The present application is a continuation-in-part application of U.S. application Ser. No. 17/535,662, filed on Nov. 25, 2021, the disclosure of which is hereby incorporated by reference herein in its entirety.

FIELD OF THE DISCLOSURE

This disclosure generally relates to a navigation device and, more particularly, to an optical navigation device that adopts a semi-collimated illumination beam to improve a light utilization efficiency and an optical engine thereof.

BACKGROUND OF THE DISCLOSURE

An optical mouse is generally put on a work surface to be operated by a user. By using a light sensor to detect a relative displacement between the optical mouse and the work surface, the optical mouse can be used to correspondingly control a cursor position on a display screen.

Some optical mice can be used to perform the hover mode operation. That is, the optical mice are operated at a height from the work surface to run different functions corresponding to different heights without being directly put on the work surface.

However, when a distance between the optical mice and the work surface becomes larger, light power reflected by the work surface to the light sensor becomes lower, especially when the work surface is not a mirror surface. Even though the hovering operation is within a predetermined working gap range, apparent degradation of detected light power still occurs with the increasing of the working gap such that the light utilization efficiency of the optical mice is decreased.

SUMMARY

Accordingly, the present disclosure provides an optical engine that causes a cross-section of an illumination light beam to have an inverse effect than the common optical mice with a working gap in a transverse direction to improve the light utilization efficiency, and an optical navigation device using the same.

The present disclosure provides an optical engine that forms a semi-collimated illumination beam within a working gap (i.e. a distance from a work surface) to improve the light utilization efficiency, and an optical navigation device using the same.

The present disclosure provides a navigation device configured to be operated relative to a work surface. The navigation device includes a light guide, a light source and a light sensor. The light guide includes a first lens and a second lens. The light source is configured to generate an illumination beam passing through the first lens to form an illuminated area on the work surface. The light sensor is arranged at a side of the light source in a first direction, and configured to receive reflected light from the illuminated area via the second lens, wherein the navigation device has a working gap from the work surface, and when the working gap is increased, a first size of the illuminated area in the first direction is not changed, and a second size of the illuminated area in a second direction perpendicular to the first direction, is reduced.

The present disclosure further provides a navigation device configured to be operated relative to a work surface. The navigation device includes a light guide, a light source and a light sensor. The light guide includes a first lens and a second lens. The light source is configured to generate an illumination beam passing through the first lens to form an illuminated area on the work surface. The light sensor is arranged at a side of the light source in a first direction, and configured to receive reflected light from the illuminated area via the second lens, wherein when a distance between the navigation device and the work surface is within an operable working gap, a first size of the illuminated area in the first direction is identical to a first initial size of the illumination beam just after leaving the first lens, and a second size of the illuminated area in the second direction is smaller than a second initial size of the illumination beam just after leaving the first lens.

The present disclosure provides an optical engine of a navigation device. The navigation device is configured to operate relative to a work surface. The optical engine includes a circuit board, a light guide and a light source. The light source is arranged on the circuit board, and configured to generate an illumination beam passing through the light guide to form an illuminated area on the work surface, wherein a first size of the illuminated area in the first direction is identical to a first initial size of the illumination beam just after leaving the light guide, and a second size of the illuminated area in the second direction, perpendicular to the first direction, is smaller than a second initial size of the illumination beam just after leaving the light guide.

BRIEF DESCRIPTION OF DRAWINGS

Other objects, advantages, and novel features of the present disclosure will become more apparent from the following detailed description when taken in conjunction with the accompanying drawings.

DETAILED DESCRIPTION OF THE DISCLOSURE

It should be noted that, wherever possible, the same reference numbers will be used throughout the drawings to refer to the same or like parts.

One objective of the present disclosure is to provide an optical navigation device capable of operating in a hover mode. In the hovering operation of the optical navigation device, a size of an illuminated area is smaller than a cross-sectional size of an illumination beam just after leaving a light guide such that light energy concentrates in a region close to a sensing region AOI of a light sensor 15 to decrease a percentage of light energy impinging outside the AOI.

In one aspect, with a longitudinal height of hovering operation (referring to a working gap herein) being increased, a size of the illuminated area in a transverse direction is gradually reduced to further achieve an effect of compensating the degradation of received light energy of the light sensor 15 caused by the increasing of the longitudinal height of hovering operation. Preferably, the light sensor 15 is arranged to receive the same light energy at different working gaps, e.g., a reduced ratio of the illumination beam is determined by detecting output of the light sensor 15 before shipment.

Figure 1:
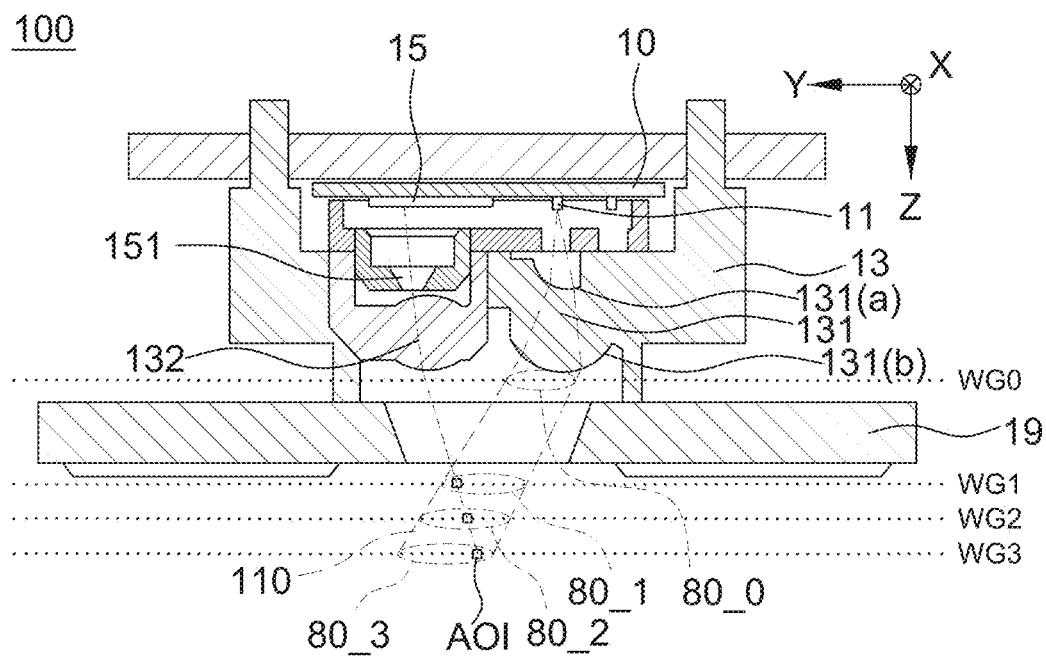
FIG. 1 is a lateral view of a navigation device in an X-direction according to a first embodiment of the present disclosure.
Figure 2:
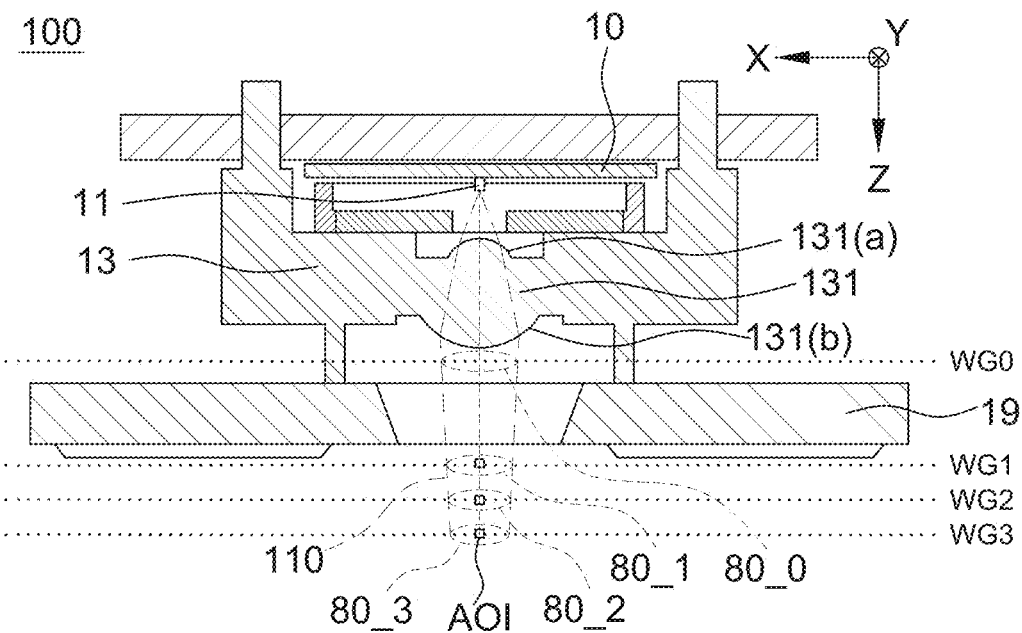
FIG. 2 is a lateral view of a navigation device in a Y-direction according to a first embodiment of the present disclosure.

Referring to FIGS. 1 and 2, FIG. 1 is a lateral view of an optical navigation device 100 (abbreviated as navigation device 100 herein) in an X-direction according to a first embodiment of the present disclosure; FIG. 2 is a lateral view of the navigation device 100 in a Y-direction according to a first embodiment of the present disclosure.

The navigation device 100 is operated relative to a work surface. The work surface is located, for example, at one position among working gaps WG1, WG2 and WG3 being shown in drawings. The material of the work surface is, for example, metal, glass, fabric, printed objects, painted objects or a combination thereof without particular limitations. The work surface is a transparent surface, a translucent surface or a diffuse surface without particular limitations.

The navigation device 100 includes a casing 19 and an optical engine inside the casing 19. The optical engine is used to generate an illumination beam 110 passing through an opening of the casing 19 and propagating to the work surface outside the casing 19, and to receive reflected light from the work surface via the opening. The navigation device 100 is, for example, an optical mouse device, a gaming mouse or a finger mouse, but not limited to.

It should be mentioned that FIGS. 1 and 2 show only a part of the casing 19 (e.g., bottom surface), and the casing 19 further has other parts covering the optical engine for being operated by a user. Since said other parts of the casing 19 are not a main objective of the present disclosure, they are not shown herein for simplification.

The optical engine of the navigation device 100 includes a circuit board 10, a light source 11, a light guide 13 and a light sensor 15.

The circuit board 10 is, for example, a printed circuit board (PCB) or a flexible board (FB) without particular limitations. In one aspect, the circuit board 10 and the light guide 13 are combined (e.g., by adhesive, securing member or engagement member, without particular limitations) to the casing 19 or a fixed member inside the casing 19 to fix a position thereof inside the casing 19. In another aspect, the light guide 13 is combined to the circuit board 10, and the circuit board 10 is combined to the casing 19 or a fixed member inside the casing 19.

The light source 11 and the light sensor 15 are arranged on the circuit board 10 and electrically connected thereto. The light guide 13 is formed as an integrated structure by using, for example, injection molding, but not limited to, and having a first lens 131 and a second lens 132. In another aspect, the light guide 13 is formed by assembling multiple parts together.

The light source 11 is, for example, a VCSEL, a light emitting diode or a laser diode, and for emitting an identifiable light spectrum, e.g., red light and/or infrared light, but not limited to. The light source 11 generates an illumination beam 110 passing through the first lens 131 of the light guide 13 to form an illuminated area on the work surface, e.g., FIGS. 1 and 2 showing illuminated areas 80_1, 80_2 and 80_3 respectively corresponding to different working gaps WG1, WG2 and WG3.

It should be mentioned that the work surface is located at any position between WG1 and WG3 determined according to the operation of a user. A distance between WG1 and WG3 is referred to a working depth of field which indicates an operable longitudinal working gap of the navigation device 100.

The light sensor 15 is a complementary metal-oxide-semiconductor (CMOS) image sensor, a charge couple device (CCD) image sensor or other sensors capable of converting optical signals to electrical signals without particular limitations. The light sensor 15 is arranged at a side of the light source 11 in a first direction (e.g., Y-direction shown in FIG. 1), and used to receive reflected light from the illuminated area via the second lens 132. The light sensor 15 has an aperture 151, which determines a corresponding sensing region AOI in the illuminated area via the light guide 13, e.g., FIGS. 1 and 2 showing respective sensing region AOI corresponding to different working gaps WG1, WG2 and WG3. That is, a size and a position of the sensing region AOI is determined according to a position of the aperture 151, and a size and a position of the light sensor 15, and the sensing region AOI may have any shape without being limited to a rectangular shape as shown in drawings.

As shown in FIG. 1, because the illumination beam 110 is refracted/inclined toward the light sensor 15 (i.e. toward the first direction Y) after passing through the first lens 131, an operable longitudinal working gap (i.e. working depth of field) of the optical engine (and the navigation device 100) is determined according to a crossed range between the sensing region AOI of the light sensor 15 and the illuminated area of the light source 11.

Figure 3:
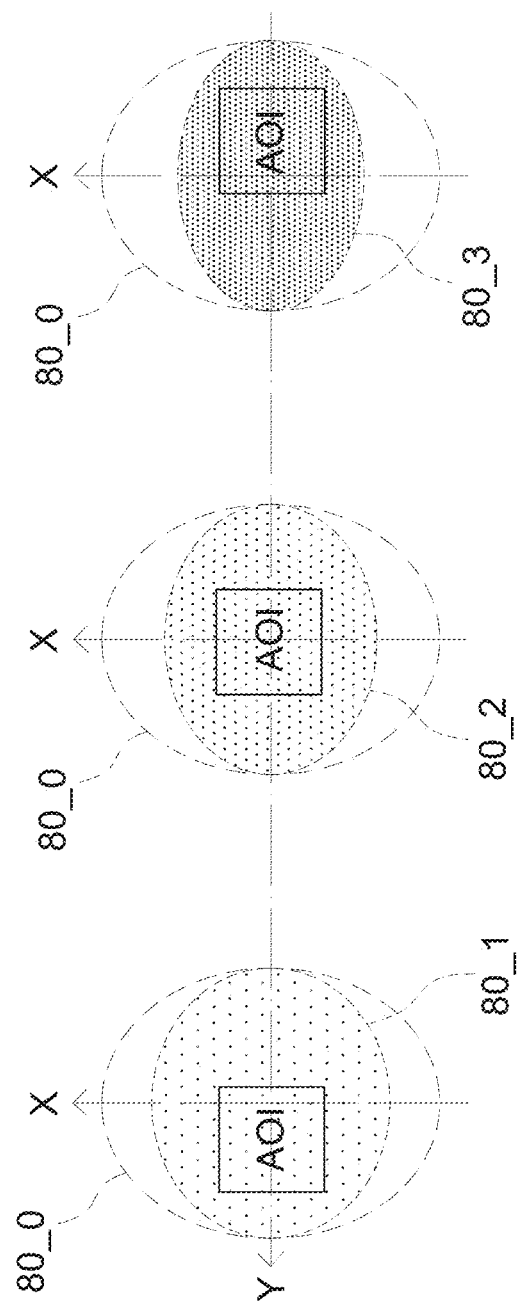
FIG. 3 is a schematic diagram of illuminated areas corresponding to different working gaps of a navigation device according to a first embodiment of the present disclosure.

Please refer to FIG. 3 together, it is a schematic diagram of illuminated areas 80_1, 80_2 and 80_3 corresponding to different working gaps WG1, WG2 and WG3 of a navigation device 100 according to a first embodiment of the present disclosure, wherein the numerical reference 80_0 indicates a cross-section of the illumination beam 110 just after leaving the first lens 131, e.g., at WG0. When the work surface is at the working gap WG1, the sensing region AOI is at one side (FIG. 3 showing at a left side, but not limited to) of the illuminated area 80_1 so as to determine a minimum working gap; whereas, when the work surface is at the working gap WG3, the sensing region AOI is at the other side (FIG. 3 showing at a right side, but not limited to) of the illuminated area 80_3 so as to determine a maximum working gap. It is seen from FIG. 3 that when the sensing region AOI goes out the left side of the illuminated area 80_1 or goes out the right side of the illuminated area 80_3, the light sensor 15 is not able to receive the reflected light from the illuminated area. In this way, a range of the operable longitudinal working gap (determined by a crossed range of the sensing region AOI and the illuminated area) of the navigation device 100 is determined.

Figure 5:
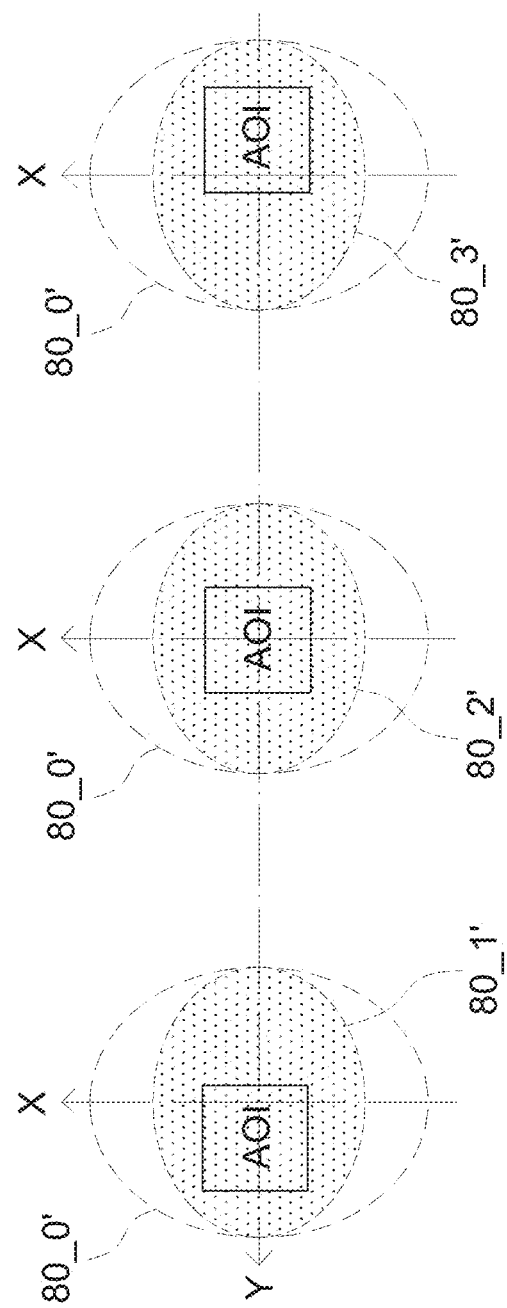
FIG. 5 is a schematic diagram of illuminated areas corresponding to different working gaps of a navigation device according to a second embodiment of the present disclosure.

In FIGS. 3 and 5, higher density of dots within the illuminated area is used to indicate higher light intensity.

In addition, since the illumination beam 110 is not refracted/inclined in the X-direction (referred to a second direction herein), the sensing region AOI is not shifted in the X-direction corresponding to different working gaps as shown in FIG. 2.

In the present disclosure, a first size (e.g., length) of the illuminated area in the first direction Y is identical to a first initial size (e.g., length of 80_0 in Y-direction at WG0) of the illumination beam 110 just after the illumination beam 110 leaves the light guide 13, and a second size (e.g., width) of the illuminated area in the second direction X, which is perpendicular to the first direction Y, is smaller than a second initial size (e.g., width of 80_0 in X-direction at WG0) of the illumination beam 110 just after the illumination beam 110 leaves the light guide 13.

Please refer to FIGS. 1 to 3, in the first embodiment, when the working gap is increased (e.g., WG1→WG2→WG3), a first size of the illuminated area in the first direction Y is not changed (e.g., 80_1, 80_2 and 80_3 having substantially the same length in Y-direction as shown in FIGS. 1 and 3), and a second size of the illuminated area in a second direction X, which is perpendicular to the first direction Y, is gradually reduced (e.g., 80_1, 80_2 and 80_3 becoming smaller in X-direction as shown in FIGS. 2 and 3). That is, the illumination beam 110 gradually converges in the second direction X after passing through the first lens 131 of the light guide 13.

In one aspect, the first lens 131 is arranged to cause the second size of the illuminated area at a lowest point (e.g., WG3) among the operable longitudinal height (i.e. working depth of field) to be reduced by 20% to 30% from a highest point (e.g., WG1) among the operable longitudinal height.

In another aspect, the first lens 131 is arranged to cause a light power per unit area of the illuminated area at a lowest point (e.g., WG3) among the operable longitudinal height to be increased by 20% to 30% from a highest point (e.g., WG1) among the operable longitudinal height.

Figure 4A:
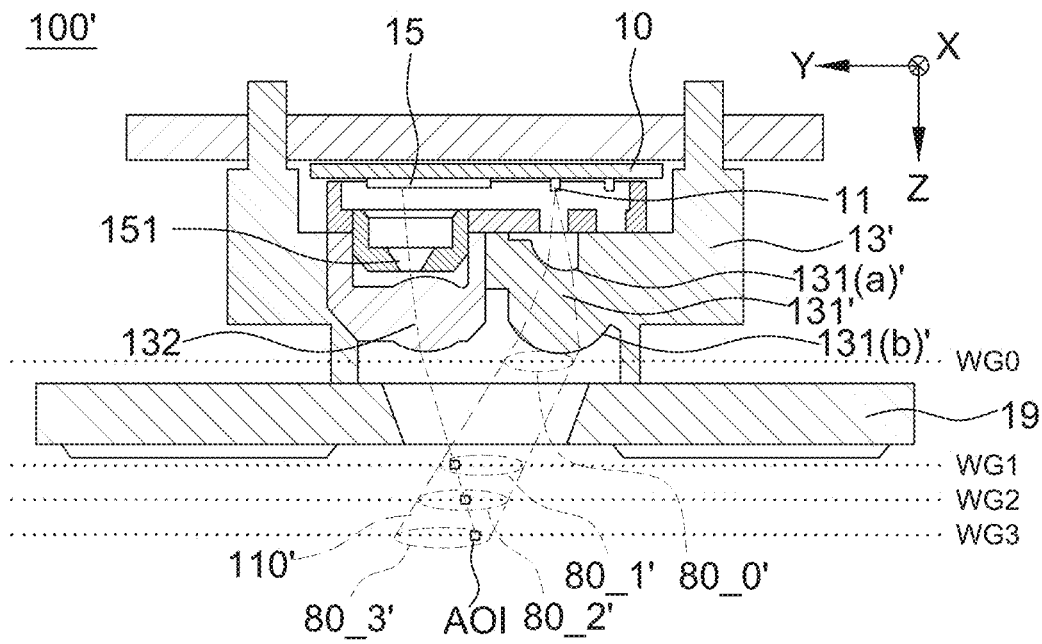
FIGS. 4 (*a*) and (*b*) are lateral views of a navigation device in an X-direction and a Y-direction, respectively, according to a second embodiment of the present disclosure.
Figure 4B:
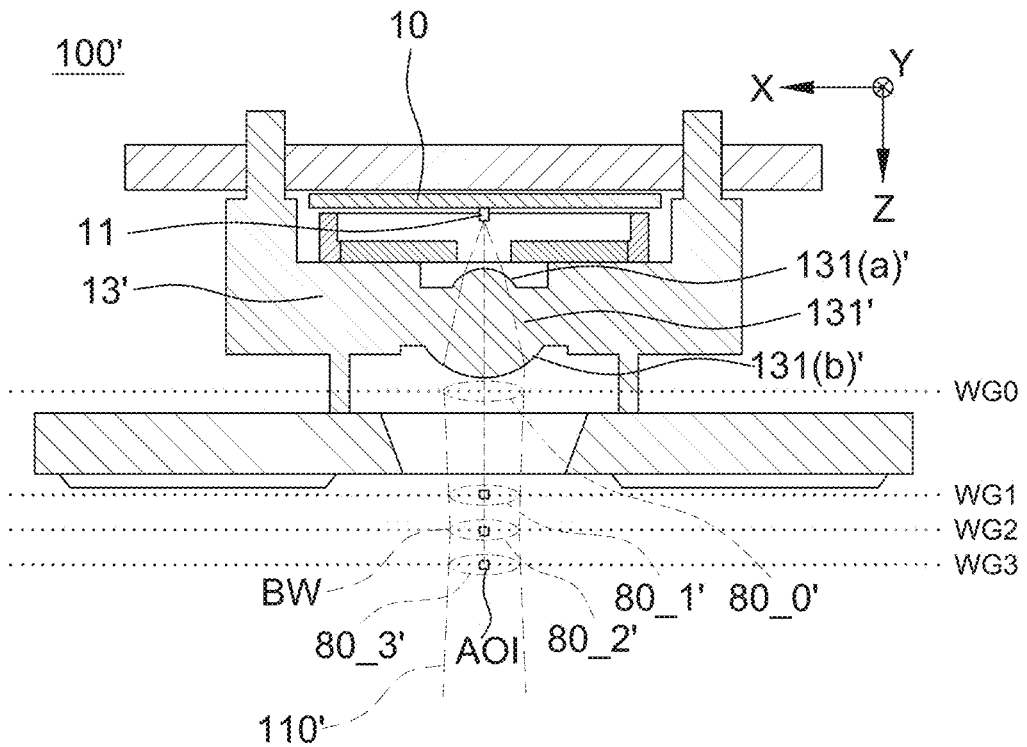

Please refer to FIG. 4(*b*), it is a lateral view of a navigation device 100' in a Y-direction according to a second embodiment of the present disclosure, wherein the lateral view of a navigation device 100' in the X-direction is substantially identical to that shown in FIG. 1, except having variations in the design of the first lens 131' of the light guide 13' and those related features affected by the design variation as indicated in FIG. 4(*a*) according to the second embodiment.

In the second embodiment, when a distance between the navigation device 100' and the work surface is within an operable working gap (e.g., between WG1 and WG3), a first size (e.g., lengths of 80_1', 80_2' and 80_3' in Y-direction as shown in FIG. 4(*a*)) of the illuminated area in the first direction Y is identical to a first initial size (e.g., a length of 80_0' in Y-direction as shown in FIG. 4(*a*)) of the illumination beam 110' just after the illumination beam 110' leaves the first lens 131' of the light guide 13', and a second size (e.g., lengths of 80_1', 80_2' and 80_3' in X-direction as shown in FIG. 4(*b*)) of the illuminated area in the second direction X is smaller than a second initial size (e.g., a length of 80_0' in X-direction as shown in FIG. 4(*b*)) of the illumination beam 110' just after the illumination beam 110' leaves the first lens 131' of the light guide 13'.

Please refer to FIG. 5 together, it is a schematic diagram of illuminated areas (e.g., 80_1', 80_2' and 80_3') corresponding to different working gaps (e.g., WG1, WG2 and WG3) of a navigation device 100' according to a second embodiment of the present disclosure, wherein the reference numeral 80_0' indicates a cross-section of the illumination beam 110' just after leaving the first lens 131' of the light guide 13'. It is seen from FIG. 5 that a first size of the illuminated areas 80_1', 80_2' and 80_3' in the first direction Y is identical to a first initial size of 80_0'; and a second size of the illuminated areas 80_1', 80_2' and 80_3' in the second direction X is smaller than a second initial size of 80_0'.

Please refer to FIG. 4(*b*) again, after passing through the first lens 131', the illumination beam 110' forms a beam waist (e.g., shown as BW in FIG. 4(*b*)) in the second direction X at a predetermined longitudinal distance. The beam waist is referred to a point or a section of the illumination beam 110' in the longitudinal direction having the minimum cross-section.

In one aspect, a lowest point (e.g., WG3) of an operable working gap of the navigation device 100' is at the beam waist to achieve the effect similar to FIG. 3, i.e. larger working gap having smaller beam width in the second direction X. In this aspect, the whole operable working gap is above the beam waist.

In another aspect, a center point (e.g., WG2) of an operable working gap of the navigation device 100' is at the beam waist, e.g., as shown in FIG. 4(*b*), to achieve the effect as show in FIG. 5, i.e. a beam width in the second direction X within the operable working gap being smaller than a second initial size of the illumination beam 110' after the illumination beam 110' just leaves the first lens 131'.

It should be mentioned that the "length" and the "width" mentioned herein are only intended to indicate sizes in different directions but not to limit the present disclosure.

To form the semi-collimated illumination beam mentioned in the first embodiment and the second embodiment, the first lens 131/131' has one of the following arrangements: the first lens 131/131' having a first biconic lens surface as a first surface 131(*a*)/131'(a) and a second biconic lens surface as a second surface 131(*b*)/131'(b); the first lens 131/131' having an axial-symmetrical lens surface as the first surface 131(*a*)/131'(a) and a biconic lens surface as the second surface 131(*b*)/131'(b); the first lens 131/131' having a biconic lens surface as the first surface 131(*a*)/131'(a) and an axial-symmetrical lens surface as the second surface 131(*b*)/131'(b); the first lens 131/131' having a first cylindrical lens surface in the first direction as the first surface 131(*a*)/131'(a) and a second cylindrical lens surface in the second direction as the second surface 131(*b*)/131'(b); the first lens 131/131' having an axial-symmetrical lens surface as the first surface 131(*a*)/131'(a) and a cylindrical lens surface in the second direction as the second surface 131(*b*)/131'(b); and the first lens 131/131' having a cylindrical lens surface in the second direction as the first surface 131(*a*)/131'(a) and an axial-symmetrical lens surface as the second surface 131(*b*)/131'(b).

In a word, as long as different curvatures are formed in the first direction Y and the second direction X at a light incidence surface (i.e. the first surface 131(*a*)/131'(a)) and the light emergent surface (i.e. the second surface 131(*b*)/131'(b)) of the first lens 131/131' to cause the illumination beam 110/110' to form a semi-collimated illumination beam after passing through the first lens 131/131', the structure of the first lens is not limited to those mentioned herein.

It should be mentioned that although FIG. 1 shows that the sensing region AOI of the light sensor 15 is deviated toward a position of the light source 11, it is only intended to illustrate but not to limit the present disclosure. In the navigation device requiring a large working field of view, the sensing region AOI of the light sensor 15 is arranged right below the light sensor 15, which can be implemented by changing the light path of the second lens 132 as described in U.S. application Ser. No. 17/535,662.

In the present disclosure, the navigation device 100/100' further includes a processor, e.g., a micro controller unit (MCU), an application specific integrated circuit (ASIC) or a field programmable gate array (FPGA) to post-process output of the light sensor 15. Said "post-process" is determined according to applications of the navigation device 100/100'.

As mentioned above, in an optical navigation device capable of performing a hovering operation, there is an issue that the received light power of a light sensor is lower when a working gap is larger. Accordingly, the present disclosure further provides an optical engine that generates a converged illumination light beam and an optical navigation device using the same (e.g., FIGS. 2 and 4(b)). The optical engine forms a collimated light beam in a first direction and a converged light beam in a second direction to form a semi-collimated illumination beam after going out from a light guide. In this way, a beam size in the first direction is kept identical to maintain a working field of view, and a beam size in the second direction is reduced to improve the light utilization efficiency.

Although the disclosure has been explained in relation to its preferred embodiment, it is not used to limit the disclosure. It is to be understood that many other possible modifications and variations can be made by those skilled in the art without departing from the spirit and scope of the disclosure as hereinafter claimed.

The invention claimed is:

1. A navigation device, configured to be operated relative to a work surface, the navigation device comprising:
   a light source, configured to generate an illumination beam passing through the first lens to form an illuminated area on the work surface; and
   a light sensor, arranged at a side of the light source in a first direction, and configured to receive reflected light from the illuminated area via the second lens, wherein
   the navigation device has a working gap from the work surface, and
   when the working gap is increased, a first size of the illuminated area which is at a distance from the first lens, on the work surface, in the first direction parallel to the work surface is not changed, and a second size of the same illuminated area which is at the same distance from the first lens, on the work surface, in a second direction parallel to the work surface and perpendicular to the first direction, is reduced.

2. The navigation device as claimed in claim 1, wherein the light sensor has a corresponding sensing region in the illuminated area via the second lens, and
   the sensing region determines an operable longitudinal height of the working gap.

3. The navigation device as claimed in claim 2, wherein the second size of the illuminated area at a lowest point among the operable longitudinal height is reduced by 20% to 30% from a highest point among the operable longitudinal height.

4. The navigation device as claimed in claim 2, wherein a light power per unit area of the illuminated area at a lowest point, at which the navigation device is farthest from the work surface, among the operable longitudinal height is increased by 20% to 30% from a highest point, at which the navigation device is closest to the work surface, among the operable longitudinal height.

5. The navigation device as claimed in claim 1, wherein
   the first lens has a first biconic lens surface as a first surface and a second biconic lens surface as a second surface to form a semi-collimated illumination beam,
   the first lens has an axial-symmetrical lens surface as the first surface and a biconic lens surface as the second surface to form a semi-collimated illumination beam, or
   the first lens has a biconic lens surface as the first surface and an axial-symmetrical lens surface as the second surface to form a semi-collimated illumination beam.

6. The navigation device as claimed in claim 1, wherein
   the first lens has a first cylindrical lens surface in the first direction as a first surface and a second cylindrical lens surface in the second direction as a second surface to form a semi-collimated illumination beam,
   the first lens has an axial-symmetrical lens surface as the first surface and a cylindrical lens surface in the second direction as the second surface to form a semi-collimated illumination beam, or
   the first lens has a cylindrical lens surface in the second direction as the first surface and an axial-symmetrical lens surface as the second surface to form a semi-collimated illumination beam.

7. A navigation device, configured to be operated relative to a work surface, the navigation device comprising:
   a light guide, comprising a first lens and a second lens;
   a light source, configured to generate an illumination beam passing through the first lens to form an illuminated area on the work surface; and
   a light sensor, arranged at a side of the light source in a first direction, and configured to receive reflected light from the illuminated area via the second lens, wherein
   when a distance between the navigation device and the work surface is within an operable working gap, a first size of the illuminated area which is at the distance from the navigation device, on the work surface, in the first direction parallel to the work surface is identical to a first initial size in the first direction of the illumination beam just after leaving the first lens, and a second size of the same illuminated area which is at the same distance from the navigation device, on the work surface, in a second direction parallel to the work surface and perpendicular to the first direction, is smaller than a second initial size in the second direction of the illumination beam just after leaving the first lens.

8. The navigation device as claimed in claim 7, wherein the light sensor has a corresponding sensing region in the illuminated area via the second lens, and
   the sensing region determines a longitudinal height of the operable working gap.

9. The navigation device as claimed in claim 8, wherein after passing the first lens, the illumination beam forms a beam waist in the second direction at a predetermined longitudinal distance.

10. The navigation device as claimed in claim 9, wherein a center point of the operable working gap is at the beam waist.

11. The navigation device as claimed in claim 9, wherein a lowest point of the operable working gap is at the beam waist.

12. The navigation device as claimed in claim 7, wherein
    the first lens has a first biconic lens surface as a first surface and a second biconic lens surface as a second surface to form a semi-collimated illumination beam,
    the first lens has an axial-symmetrical lens surface as the first surface and a biconic lens surface as the second surface to form a semi-collimated illumination beam, or
    the first lens has a biconic lens surface as the first surface and an axial-symmetrical lens surface as the second surface to form a semi-collimated illumination beam.

13. The navigation device as claimed in claim 7, wherein
    the first lens has a first cylindrical lens surface in the first direction as a first surface and a second cylindrical lens surface in the second direction as a second surface to form a semi-collimated illumination beam, the first lens has an axial-symmetrical lens surface as the first surface and a cylindrical lens surface in the second direction as the second surface to form a semi-collimated illumination beam, or the first lens has a cylindrical lens surface in the second direction as the first surface and an axial-symmetrical lens surface as the second surface to form a semi-collimated illumination beam.

14. An optical engine of a navigation device, the navigation device being configured to operate relative a work surface, the optical engine comprising:

a circuit board;

a light guide; and a light source, arranged on the circuit board, and configured to generate an illumination beam passing through the light guide to form an illuminated area on the work surface, wherein a first size of the illuminated area, on the work surface which is at a distance from the light guide, in the first direction parallel to the work surface is identical to a first initial size in the first direction of the illumination beam just after leaving the light guide, and a second size of the same illuminated area which is at the same distance from the light guide, on the work surface, in a second direction parallel to the work surface and perpendicular to the first direction, is smaller than a second initial size in the second direction of the illumination beam just after leaving the light guide.

15. The optical engine as claimed in claim 14, furthering comprising a light sensor arranged on the circuit board, wherein the first direction is a connecting line direction between the light source and the light sensor.

16. The optical engine as claimed in claim 15, wherein the light sensor has a corresponding sensing region in the illuminated area via the light guide, and an operable longitudinal working gap of the optical engine is determined according to a crossed range between the sensing region and the illuminated area.

17. The optical engine as claimed in claim 14, wherein the light guide comprises a first lens for the illumination beam to pass through, and the illumination beam gradually converges in the second direction after passing through the first lens.

18. The optical engine as claimed in claim 14, wherein the light guide comprises a first lens for the illumination beam to pass through, and the illumination beam forms a beam waist at a predetermined distance in the second direction after passing through the first lens.

19. The optical engine as claimed in claim 14, wherein the first lens has a first biconic lens surface as a first surface and a second biconic lens surface as a second surface to form a semi-collimated illumination beam, the first lens has an axial-symmetrical lens surface as the first surface and a biconic lens surface as the second surface to form a semi-collimated illumination beam, or the first lens has a biconic lens surface as the first surface and an axial-symmetrical lens surface as the second surface to form a semi-collimated illumination beam.

20. The optical engine as claimed in claim 14, wherein the first lens has a first cylindrical lens surface in the first direction as a first surface and a second cylindrical lens surface in the second direction as a second surface to form a semi-collimated illumination beam, the first lens has an axial-symmetrical lens surface as the first surface and a cylindrical lens surface in the second direction as the second surface to form a semi-collimated illumination beam, or the first lens has a cylindrical lens surface in the second direction as the first surface and an axial-symmetrical lens surface as the second surface to form a semi-collimated illumination beam.

* * * * *